(12) United States Patent
Kim et al.

(10) Patent No.: US 9,572,156 B2
(45) Date of Patent: Feb. 14, 2017

(54) METHOD AND APPARATUS FOR TRANSMITTING AND RECEIVING CHANNEL INFORMATION IN WIRELESS COMMUNICATION SYSTEM

(75) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 555 days.

(21) Appl. No.: 14/004,461

(22) PCT Filed: Mar. 12, 2012

(86) PCT No.: PCT/KR2012/001768
§ 371 (c)(1),
(2), (4) Date: Oct. 1, 2013

(87) PCT Pub. No.: WO2012/124949
PCT Pub. Date: Sep. 20, 2012

(65) Prior Publication Data
US 2014/0044073 A1    Feb. 13, 2014

Related U.S. Application Data

(60) Provisional application No. 61/481,665, filed on May 2, 2011, provisional application No. 61/452,075, filed on Mar. 11, 2011.

(51) Int. Cl.
*H04W 72/04* (2009.01)
*H04W 16/14* (2009.01)
(Continued)

(52) U.S. Cl.
CPC ......... *H04W 72/0453* (2013.01); *H04W 16/14* (2013.01); *H04W 74/0808* (2013.01); *H04W 84/12* (2013.01)

(58) Field of Classification Search
CPC .. H04W 72/0453; H04W 16/14; H04W 84/12; H04W 74/0808
See application file for complete search history.

(56) References Cited

U.S. PATENT DOCUMENTS

2009/0191906 A1* 7/2009 Abedi .................. H04W 16/14
455/501
2010/0309317 A1* 12/2010 Wu ....................... H04W 16/14
348/180

(Continued)

OTHER PUBLICATIONS

LG Electronics, "Proposed Changes related to Dynamic Channel Power Management", IEEE 802.11, IEEE 802.11-10-0767r1, Jul. 14, 2010.

(Continued)

*Primary Examiner* — Ajay Cattungal
(74) *Attorney, Agent, or Firm* — Morgan, Lewis & Bockius LLP

(57) ABSTRACT

One embodiment of the present invention relates to a method for transmitting channel information in a wireless communication system. Disclosed is method for transmitting channel information, comprising the steps of: generating a frame which includes an operating class field and a channel number field; and transmitting the generated frame, wherein the channel number field indicates a number of a wireless local area network (WLAN) channel allocated according to available channel information.

14 Claims, 14 Drawing Sheets

(51) Int. Cl.
  *H04W 84/12* (2009.01)
  *H04W 74/08* (2009.01)

(56) References Cited

U.S. PATENT DOCUMENTS

| | | | | |
|---|---|---|---|---|
| 2012/0071189 A1* | 3/2012 | Mody | ................ | H04L 27/0006 455/513 |
| 2012/0307817 A1* | 12/2012 | Chen | ................ | H04N 21/2381 370/338 |
| 2013/0058247 A1* | 3/2013 | Chen | ................ | H04W 72/1215 370/252 |
| 2013/0079046 A1* | 3/2013 | Chen | ................ | H04W 16/14 455/509 |
| 2014/0003361 A1* | 1/2014 | Song | ................ | H04W 16/14 370/329 |
| 2014/0030997 A1* | 1/2014 | Sundstrom | ................ | H03D 7/16 455/326 |

OTHER PUBLICATIONS

NICT, "Normative text for network channel control", IEEE 802.11, IEEE 802.11-10-1130r2, Nov. 9, 2010.
Nokia, "TVWS enablement draft text", IEEE 802.11, IEEE 802.11-10/0813r2, Aug. 9, 2010.
NICT, "Normative text for channel enablement", IEEE 802.11, IEEE 802.11-10/0724r1, Jun. 22, 2010.
Written Opinion and International Search Report issued in corresponding International Patent Application No. PCT/KR2012/001768 dated Oct. 29, 2012.

\* cited by examiner

FIG. 10
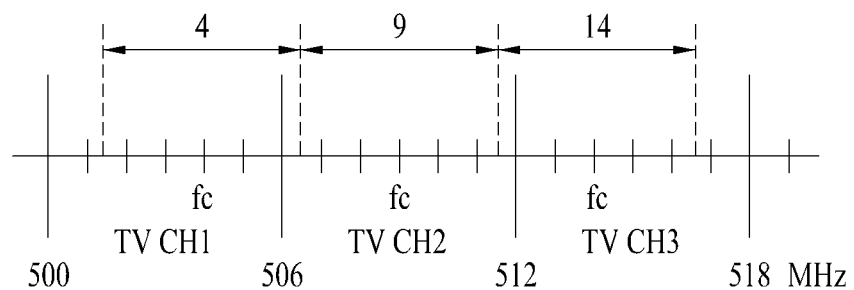
(a)
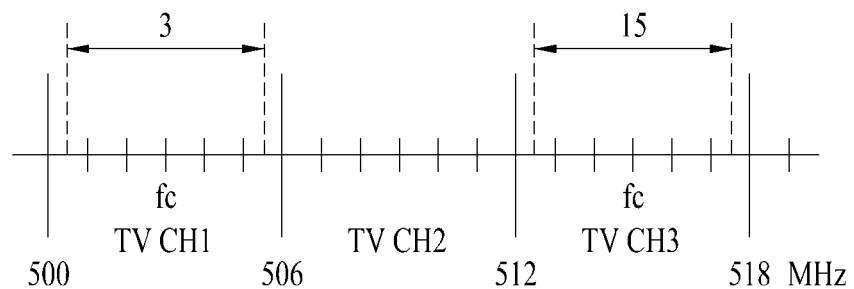
(b)

FIG. 11

These fields are repeared as determined by length field

| Element ID | Length | Operating Class | Number of Channel | Channel Number n |
|---|---|---|---|---|
| Octets: 1 | 1 | 1 | 1 | Variable |

FIG. 12

These fields are repeared as determined by length field

| Element ID | Length | Operating Class | Number of Channel | Channel Number n | Maximum Transmit Power for Channel Number n |
|---|---|---|---|---|---|
| Octets: 1 | 1 | 1 | 1 | | Variable |

METHOD AND APPARATUS FOR TRANSMITTING AND RECEIVING CHANNEL INFORMATION IN WIRELESS COMMUNICATION SYSTEM

TECHNICAL FIELD

The present invention relates to a method and apparatus for transmitting and receiving channel information in a wireless communication system.

BACKGROUND ART

Standards for wireless local area network (WLAN) technology have been and continue to be developed by the institute of electrical and electronics engineers (IEEE) as the 802.11 standard. IEEE 802.11a and b use an unlicensed band at 2.4 GHz or 5 GHz, IEEE 802.11b provides a transmission speed of 11 Mbps, and IEEE 802.11a provides a transmission speed of 54 Mbps. IEEE 802.11g applies orthogonal frequency division multiplexing (OFDM) at 2.4 GHz to provide a transmission speed of 54 Mbps. IEEE 802.11n applies multiple input multiple output-OFDM (MIMO-OFDM) to provide a transmission speed of 300 Mbps for four spatial streams. IEEE 802.11n supports a channel bandwidth up to 40 MHz and in this case, provides a transmission speed of 600 Mbps.

IEEE 802.11af is a standard defining an operation of an unlicensed device in a TV whitespace (TVWS) band.

TVWS is a frequency band allocated to a broadcast TV, which includes an ultra high frequency (UHF) band and a very high frequency (VHF) band and in which an unlicensed device is permitted to operate so long as such operation does not interfere with that of a licensed device. Examples of a licensed device may include a TV, a wireless microphone, and so on. The licensed device may be called an incumbent user or a primary user. In addition, in order to overcome problems in terms of coexistence between unlicensed devices using the TVWS, a frequency sensing mechanism, a signaling protocol such as a common beacon frame, and so on may be needed. An unlicensed device operating in the TVWS may be classified into a fixed device, a personal/portable mode I device, a personal/portable mode II device, and so on. The fixed device is a fixed user equipment (UE) that needs to register a location thereof in a geo-location database (DB) and accesses the geo-location DB to acquire an available channel list. The fixed device operates in the corresponding available channel list. In this regard, when a channel being used by the fixed device is no longer available, the fixed device stops using the channel. The personal/portable mode II device is a personal portable UE that does not register a location thereof in the geo-location DB but accesses the geo-location DB to acquire an available channel list at the location of thereof. The personal/portable mode II device operates in the corresponding available channel list. In this regard, when a channel being used by the personal/portable mode II device is no longer available, the device stops using the channel. Compared with the fixed device, transmission output power of the personal/portable mode II device is limited. The personal/portable mode I device is controlled by the fixed device and the personal/portable mode II device. Like the personal/portable mode II device, the personal/portable mode I device does not register a location thereof in the geo-location DB. However, the personal/portable mode I device confirms validity of a device ID of the personal/portable mode I device through the geo-location DB and then use thereof is permitted. In addition, the personal/portable mode I device needs to acquire the available channel list from the personal/portable mode II device and to confirm that the available channel list is not periodically changed.

Operations of all unlicensed devices, except for in certain special cases, are allowed at 512 to 608 MHz and 614 to 698 MHz. However, only communication between fixed devices is allowed in a band of 54 to 60 MHz, 76 to 88 MHz, and 174 to 216 MHz, and 470 to 512 MHz. The fixed device refers to a device for transmitting a signal at a predetermined location only. An IEEE 802.11 TVWS UE refers to an unlicensed device that operates using an IEEE 802.11 media access control (MAC) and a physical layer (PHY) in a TVWS spectrum.

An unlicensed device that desires to use TVWS needs to provide a function of protecting a licensed device. Thus, the unlicensed device should check whether the licensed device occupies a corresponding band prior to transmission of signals in the TVWS.

To this end, the unlicensed device may perform spectrum sensing to check whether the corresponding band is being used by the licensed device. Examples of spectrum sensing mechanism may include an energy detection method, a feature detection method, and so on. When a signal received at a specific channel is greater than or equal to a predetermined value or a DTV preamble is detected, the unlicensed device may determine that the licensed device is using the specific channel. In addition, when the unlicensed device determines that the licensed device is being used in a channel adjacent to a currently used channel, the unlicensed device needs to reduce transmit power thereof.

In addition, the unlicensed device needs to access a DB through the Internet or a leased line to acquire channel list information that is available by the unlicensed device in a corresponding area. The DB stores and manages information regarding licensed devices registered therein and channel usage information that dynamically varies according to geo-location and usage time of corresponding licensed devices.

Through this specification, a whitespace band includes the aforementioned TVWS but is not limited thereto. The term whitespace band as used herein refers to a band in which an operation of a licensed device is preferentially allowed and an operation of an unlicensed device is allowed only when the licensed device is protected. In addition, a whitespace device operates in a whitespace band. For example, a device based on an IEEE 802.11 system is also an example of the whitespace device. In this case, the whitespace device may refer to an unlicensed device that operates using an IEEE 802.11 MAC layer and PHY layer in the whitespace band. That is, a general 802.11 standard-based AP and/or STA operating in the whitespace band may be an example of the unlicensed device.

DISCLOSURE

Technical Problem

An object of the present invention devised to solve the problem lies in dynamic allocation of a wireless local area network (WLAN) channel when some bands of a whitespace are used by a primary user.

Another object of the present invention devised to solve the problem lies in using a non-overlapping WLAN channel in a WLAN channel set available in a whitespace.

It is to be understood that both the foregoing general description and the following detailed description of the present invention are exemplary and explanatory and are intended to provide further explanation of the invention as claimed.

Technical Solution

In a first aspect of the present invention, provided herein is a method of transmitting channel information in a wireless communication system, the method including generating a frame including an operating class field and a channel number field, and transmitting the generated frame, wherein the channel number field indicates a number of a wireless local area network (WLAN) reallocated according to available channel information.

In second aspect of the present invention, provided herein is a method of receiving channel information in a wireless communication system, the method including receiving a frame including an operating class field and a channel number field, and performing communication using the channel number field of the frame, wherein the channel number field indicates a number of a wireless local area network (WLAN) reallocated according to available channel information.

In third aspect of the present invention, provided herein is an apparatus for transmitting channel information in a wireless communication system, the apparatus including a transceiver and a processor for controlling the apparatus including the transceiver, wherein the processor generates a frame including an operating class field and a channel number field and controls the apparatus to transmit the generated frame through the transceiver, and wherein the channel number field indicates a number of a wireless local area network (WLAN) reallocated according to available channel information.

In fourth aspect of the present invention, provided herein is an apparatus for receiving channel information in a wireless communication system, the apparatus including a transceiver and a processor for controlling the apparatus including the transceiver, wherein the processor receives a frame including an operating class field and a channel number field through the transceiver and controls the apparatus to perform communication using the channel number field, and wherein the channel number field indicates a number of a wireless local area network (WLAN) reallocated according to available channel information.

The above first through fourth aspects may include all or some of the following features.

A number of the reallocated WLAN channel may not be limited by a WLAN channel set indicated by the operating class field.

Reallocation of the WLAN channel may be performed so as to have a maximum number of WLAN channels corresponding to a frequency band determined according to the available channel information.

Reallocation of the WLAN channel may be determined in further consideration of maximum transmit power information.

The frame may further include a maximum transmit power information field for each reallocated WLAN channel.

The available channel information may indicate a TV channel, not used by a primary user, among TV channels of a TV whitespace band.

In fifth aspect of the present invention, provided herein is a method of transmitting channel information in a wireless communication system, the method including generating a frame including an operating class field and a channel number field and transmitting the generated frame, wherein the channel number field includes a number of a WLAN channel except for one or more non-overlapping WLAN channels among WLAN channels corresponding to a frequency band determined according to available channel information in a WLAN channel set indicated by a value of the operating class field.

In sixth aspect of the present invention, provided herein is a method of receiving channel information in a wireless communication system, the method including receiving a frame including an operating class field and a channel number field and performing communication using the channel number field of the frame, wherein the channel number field includes a number of a WLAN channel except for one or more non-overlapping WLAN channels among WLAN channels corresponding to a frequency band determined according to available channel information in a WLAN channel set indicated by a value of the operating class field.

In seventh aspect of the present invention, provided herein is an apparatus for transmitting channel information in a wireless communication system, the apparatus including a transceiver and a processor for controlling the apparatus including the transceiver, wherein the processor generates a frame including an operating class field and a channel number field and transmits the frame through the transceiver, and wherein the channel number field includes a number of a WLAN channel except for one or more non-overlapping WLAN channels among WLAN channels corresponding to a frequency band determined according to available channel information in a WLAN channel set indicated by a value of the operating class field.

In eighth aspect of the present invention, provided herein is a method of receiving channel information in a wireless communication system, the method including a transceiver and a processor for controlling the apparatus including the transceiver, wherein the processor receives a frame including an operating class field and a channel number field through the transceiver, and wherein the channel number field includes a number of a WLAN channel except for one or more non-overlapping WLAN channels among WLAN channels corresponding to a frequency band determined according to available channel information in a WLAN channel set indicated by a value of the operating class field.

The above fifth through eighth aspects may include all or some of the following features.

The number of the WLAN channel of the channel number field may be for prevention of use in a station (STA).

The WLAN channel included in the WLAN channel set may have any one of bandwidths of 2 MHz, 4 MHz, 8 MHz, and 16 MHz, and the bandwidth of 4 MHz, 8 MHz, or 16 MHz is obtained by bonding WLAN channels having a bandwidth of 2 MHz.

Advantageous Effects

According to the present disclosure, there is a provided a method and apparatus for dynamically allocating a wireless local area network (WLAN) channel and signaling channel information when some bands of a whitespace are used by a primary user.

According to the present disclosure, there is a provided a method and apparatus for selecting a non-overlapping WLAN channel among WLAN channels available in a whitespace and signaling channel information.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram illustrating dynamic WLAN allocation according to an embodiment of the disclosure;

FIG. 11 is a diagram for explanation of a channel set management information element format;

FIG. 12 is a diagram for explanation of an extended channel set management information element format;

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

First, a general structure of a wireless local area network (WLAN) system will be described with reference to FIGS. 1 and 2.

Figure 1:
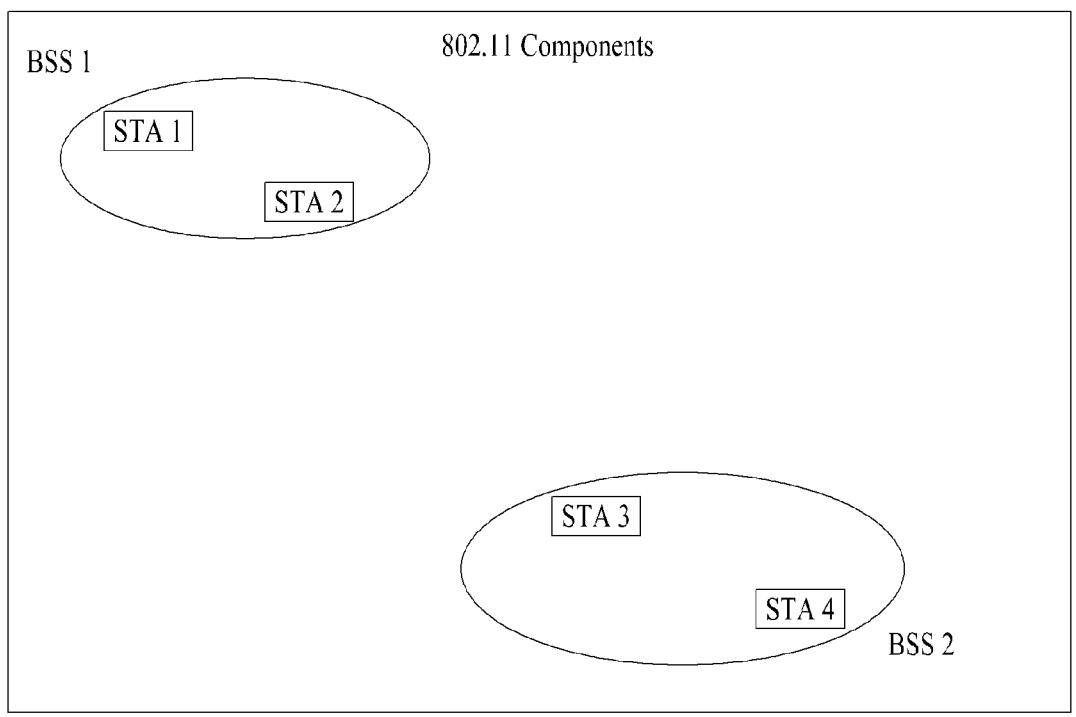
FIG. 1 is a diagram of an example of a structure of a wireless local area network (WLAN) system.

FIG. 1 is a diagram of an example of a structure of a WLAN system.

As illustrated in FIG. 1, the WLAN system includes one or more basic service set (BSS). The BSS is a set of stations (STAs) that succeed in synchronization to communicate with each other.

The STA is a logical object including a medium access control (MAC) layer and a physical layer interface for a wireless medium and includes an access point (AP) and a non-AP station. Among STAs, a portable UE manipulated by a user is a non-AP STA. In this regard, the term STA indicates a non-AP STA. The non-AP STA may also be referred to by other terms such as terminal, wireless transmit/receive unit (WTRU), user equipment (UE), mobile station (MS), mobile terminal, mobile subscriber unit, and so on.

In addition, the AP is a medium that allows an STA associated with the AP to access a distribution system (DS) through a wireless medium. The AP may also be called a convergence controller, a base station (BS), a node-B, a base transceiver system (BTS), a site controller, or the like.

The BSS may be classified into an infrastructure BSS and an independent BSS (IBSS).

The BBS illustrated in FIG. 1 is an IBSS. The IBSS refers to a BSS that does not include an AP. Since the IBSS does not include an AP, the IBSS does not allow access to a DS and thus constitutes a self-contained network.

Figure 2:
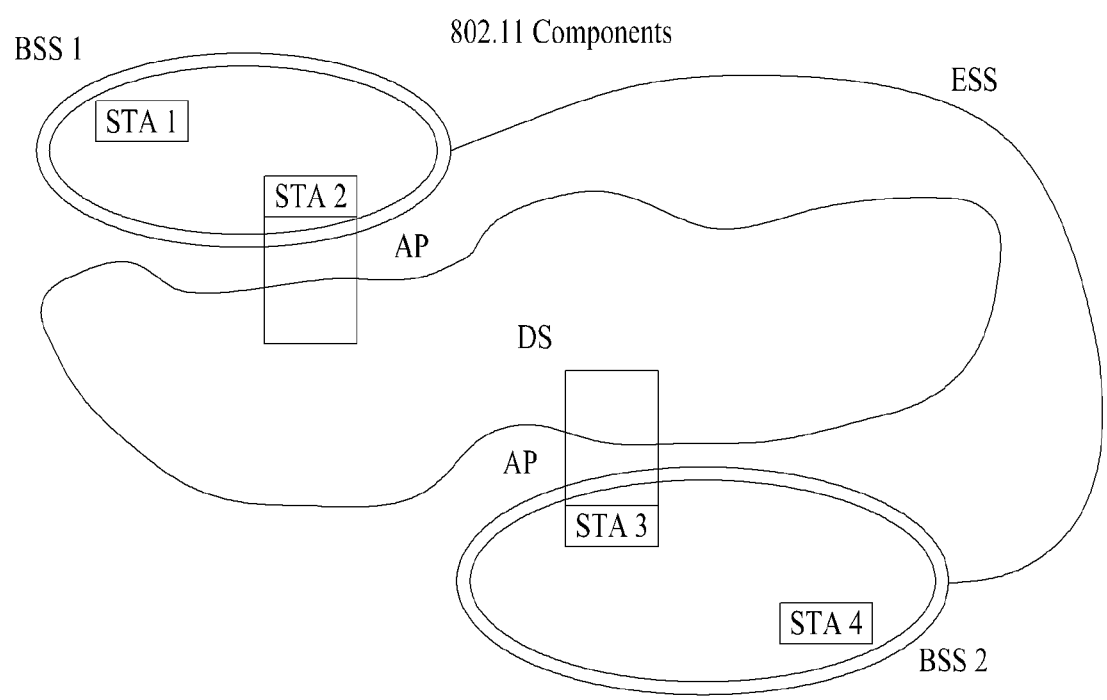
FIG. 2 is a diagram of another example of a structure of a WLAN system.

FIG. 2 is a diagram of another example of a structure of a WLAN system.

A BSS illustrated in FIG. 2 is an infrastructure BSS. The infrastructure BSS includes one or more STAs and APs. In the infrastructure BSS, non-AP STAs communicate with each other through the APs in principle. However, when a direct link is established between non-AP STAs, direct communication between non-AP STAs is possible.

As illustrated in FIG. 2, a plurality of infrastructure BSSs may be connected to each other through a DS. A plurality of BSSs connected through the DS is referred to as an extended service set (ESS). STAs included in the ESS may communicate with each other. A non-AP STA may move from one BSS to another BSS while communicating in the same ESS without intermission.

The DS is a mechanism for connection among a plurality of APs, is not always a network, and is not limited to a particular form as long as the DS provides a predetermined distributed service. For example, the DS may be a wireless network such as a mesh network or a physical structure for connecting APs to each other.

A spectrum that is not used by a licensed device may be referred to as a whitespace and used by an unlicensed device. For an operation of an STA in a whitespace spectrum, a protection scheme for an incumbent user needs to be preferentially provided. In order to protect the licensed device, the STA or the AP needs to use only a channel that is not used by the incumbent user. A channel that is not used by the unlicensed device and can be used by the unlicensed device is referred to as an available channel. Examples of a basic method of determining availability of a TV channel by the STA or the AP include spectrum sensing and a method of accessing a DB to acquire information of a TV channel schedule. Information of the DB includes information regarding a usage schedule of a specific channel of the unlicensed device at a specific location. Thus, an STA or AP that desires to check whether a TV channel is available needs to access the DB through the Internet to acquire DB information based on location information of the STA or the AP.

In order to access a network, the STA needs to search for an accessible network. The STA needs to identify a compatible network prior to participation in a wireless network. In this regard, a process of identifying a network present in a specific region is referred to as scanning. Scanning includes active scanning and passive scanning.

Figure 3:
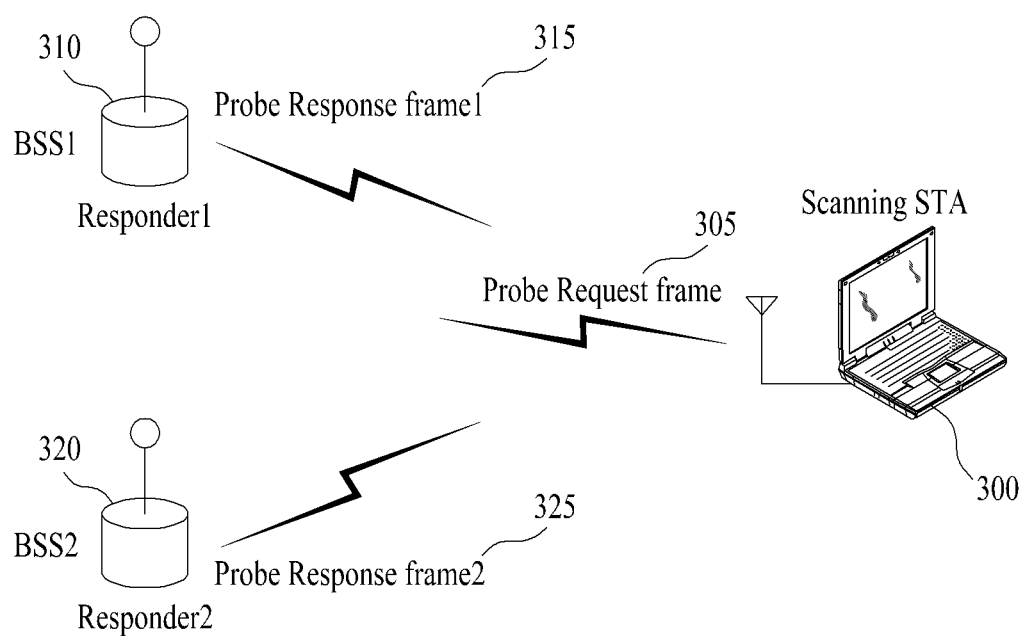
FIG. 3 is a schematic diagram of active scanning.

FIG. 3 is a schematic diagram of active scanning.

In the active scanning, an STA that performs the scanning transmits a probe request frame and awaits a response thereto in order to investigate APs present therearound while moving across channels. A responder transmits a probe response frame in response to the probe request frame to the STA that transmits the probe request frame. Here, the responder is an STA that lastly transmits a beacon frame in a BSS of a channel that is being scanned. In an infrastructure BSS, an AP transmits a beacon frame and thus the AP is a responder. In an IBSS, STAs in the IBSS alternately transmit a beacon frame and thus a responder is not fixed.

Referring to FIG. 3, when a scanning STA 300 transmits a probe request frame 305, a responder 1 310 of a BSS1 and a responder 2 320 of a BSS2, which receive a probe request frame, transmit a probe response frame 1 315 and a probe response frame 2 325 to the scanning STA 300, respectively. The scanning STA 300 that receives a probe response frame stores BSS related information included in the received probe response frame, moves to the next channel, and performs scanning using the same method in the next channel.

Figure 4:
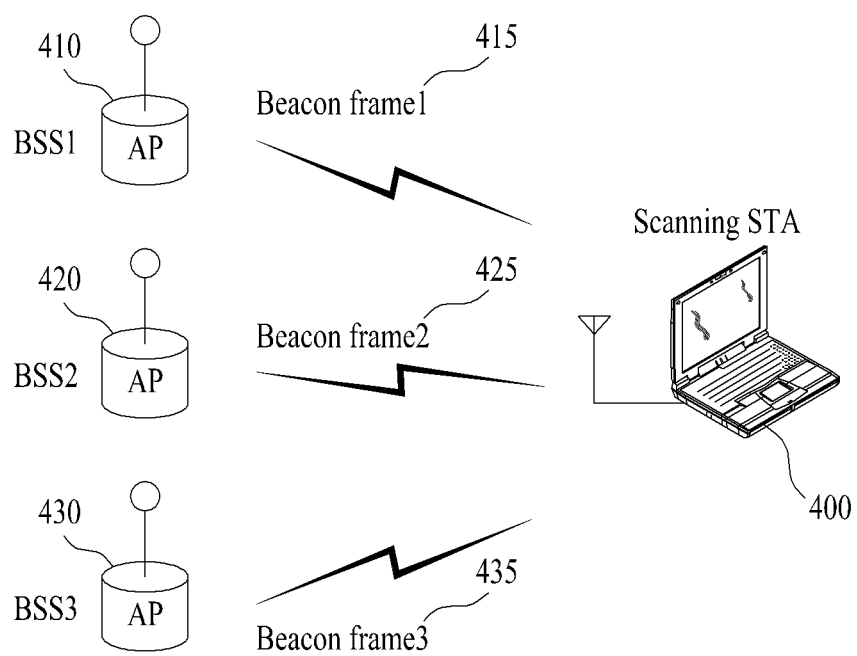
FIG. 4 is a schematic diagram of passive scanning.

FIG. 4 is a schematic diagram of passive scanning.

In the passive scanning, an STA that performs the scanning awaits a beacon frame while moving across channels. The beacon frame is a management frame in the IEEE 802.11 and is periodically transmitted so as to indicate existence of a wireless network and to allow the STA that performs the scanning to search for a wireless network and to participate in the wireless network. In an infrastructure BSS, an AP periodically transmits a beacon frame.

When the STA that performs the scanning receives a beacon frame, the STA stores information regarding a BSS included in the beacon frame and records beacon frame information at each channel while moving to another channel.

In FIG. 4, when a scanning STA 400 that performs channel scanning using a passive scanning method in a specific channel receives a beacon frame 1 415 transmitted from an AP1 410 of a BSS1 and a beacon frame 2 425 transmitted from an AP2 420 of a BSS2 and does not receive a beacon frame 3 435 transmitted from an AP3 430 of a BSS3, the scanning STA 400 stores discovery of two BSSs, BSS1 and BSS2, in a measurement channel and moves to another channel.

Comparing active scanning and passive scanning, the active scanning is more advantageous than the passive scanning in terms of low delay and power consumption.

Hereinafter, a process of enabling an STA to operate in a whitespace band will be described.

An unlicensed device that operates in a whitespace band may be classified into an enabling STA and a dependent STA. The enabling STA can enable the dependent STA, can transmit a signal without reception of an enabling signal, and initiate a network.

The enabling STA may provide geo-location information to a DB and acquire available channel information that can be used at a corresponding geo-location from the DB. The enabling STA is not always a WLAN STA and may be a logical object or a network server that can provide services related to enablement.

The dependent STA is an STA that can transmit a signal only upon receiving an enabling signal and is controlled by the enabling STA. The dependent STA needs to be enabled through the enabling STA and cannot be independently enabled.

Figure 5:
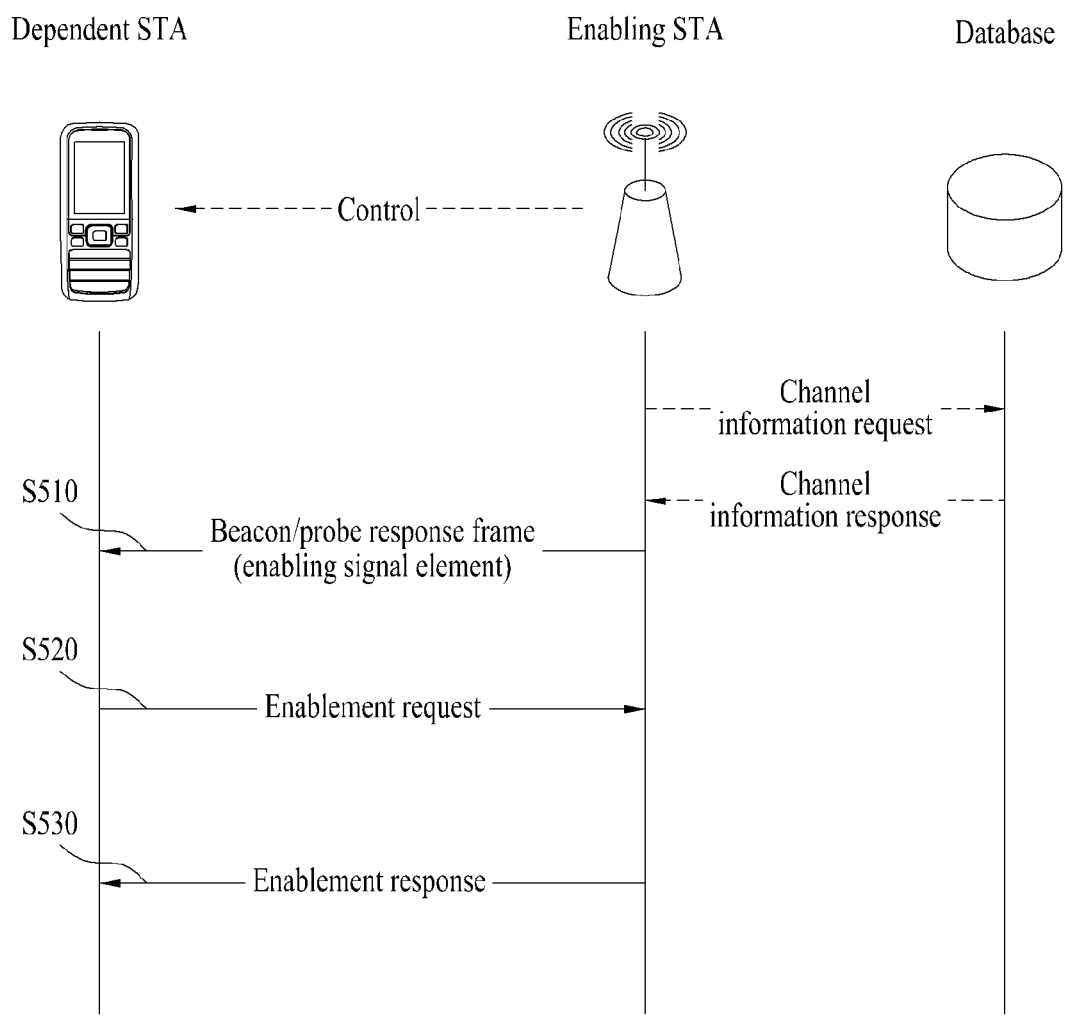
FIG. 5 is a diagram of an example of an enablement process of a station (STA)

FIG. 5 is a diagram of an example of an enablement process of an STA.

IEEE 802.11y is a standard formed for an operation of an unlicensed device in a band of 3.5 GHz and describes an enablement process that is referred to as dynamic STA enablement (DSE). A process of enabling the dependent STA by the enabling STA may be performed in a similar way to the DSE of IEEE 802.11y. In reality, an enablement process applied to a whitespace is not always the same as the DSE. However, basically, the enablement process is the same as the DSE in that the dependent STA can transmit a signal to a corresponding band/channel only after receiving an enabling signal.

As illustrated in FIG. 5, the enabling STA may transmit a probe response frame and beacon including the enabling signal to the dependent STA (S510). A signal indicating that enabling is possible is referred to as an enabling signal. In this regard, in an example illustrated in FIG. 5, the probe response frame or beacon including an enabling signal element corresponds to the enabling signal. The dependent STA that receives and decodes the enabling signal transmits an enablement request frame to the enabling STA using a channel used to receive a corresponding signal (S520) and receives an enablement response frame from the enabling STA (S530).

Configuration of Available Channel Information

In order to allow an unlicensed device instead of an incumbent user to operate in a whitespace, the corresponding unlicensed device may acquire a channel that does not interfere with an incumbent user at a specific location, that is, available channel information and may operate according to the available channel information for protection of the incumbent user. The available channel information may include an available channel list that is a set of one or more available channels.

As described above, available channel information acquired by an enabling STA from a DB and/or available channel information (or an available channel list) acquired by a dependent STA from the enabling STA may be provided in the form of a whitespace map (WSM). As illustrated in FIG. 5, the available channel list (or WSM) may be transmitted between STAs or provided through channel availability query (CAQ) request/response, etc.

Channel configuration in a whitespace band will be described with regard to an example. The channel configuration will be described with regard to a TVWS band as an example of a whitespace band. However, the scope of the present disclosure is not limited to unlicensed device-related operation in the TVWS and can be applied to a general unlicensed device-related operation in a whitespace. The TVWS may include conventional VHF and UHF frequency bands. Devices (which are referred to as TV band devices (TVDBs)) such as APs and STAs operating in the TVWS can use approximately 30 channels. In this case, basically, a bandwidth unit of one channel may be 6 MHz. In order to allow the TVBD to use a channel in the TVWS, an incumbent user should not be present in the channel. In addition, since a bandwidth unit of one channel used by an incumbent user is 6 MHz, a bandwidth of a channel used by the TVBD needs to be 6 MHz or less. Here, an IEEE 802.11a system supports a channel bandwidth of 5 MHz/10 MHz/20 MHz and thus can use 5 MHz as a basic channel bandwidth for a TVBD operation. In addition, a bandwidth of a channel that can be used by the TVBD may be 10 MHz or 20 MHz according to the number of contiguous channels in which an incumbent user is not present in the TVWS.

Dynamic Allocation of WLAN Channel

Figure 6:
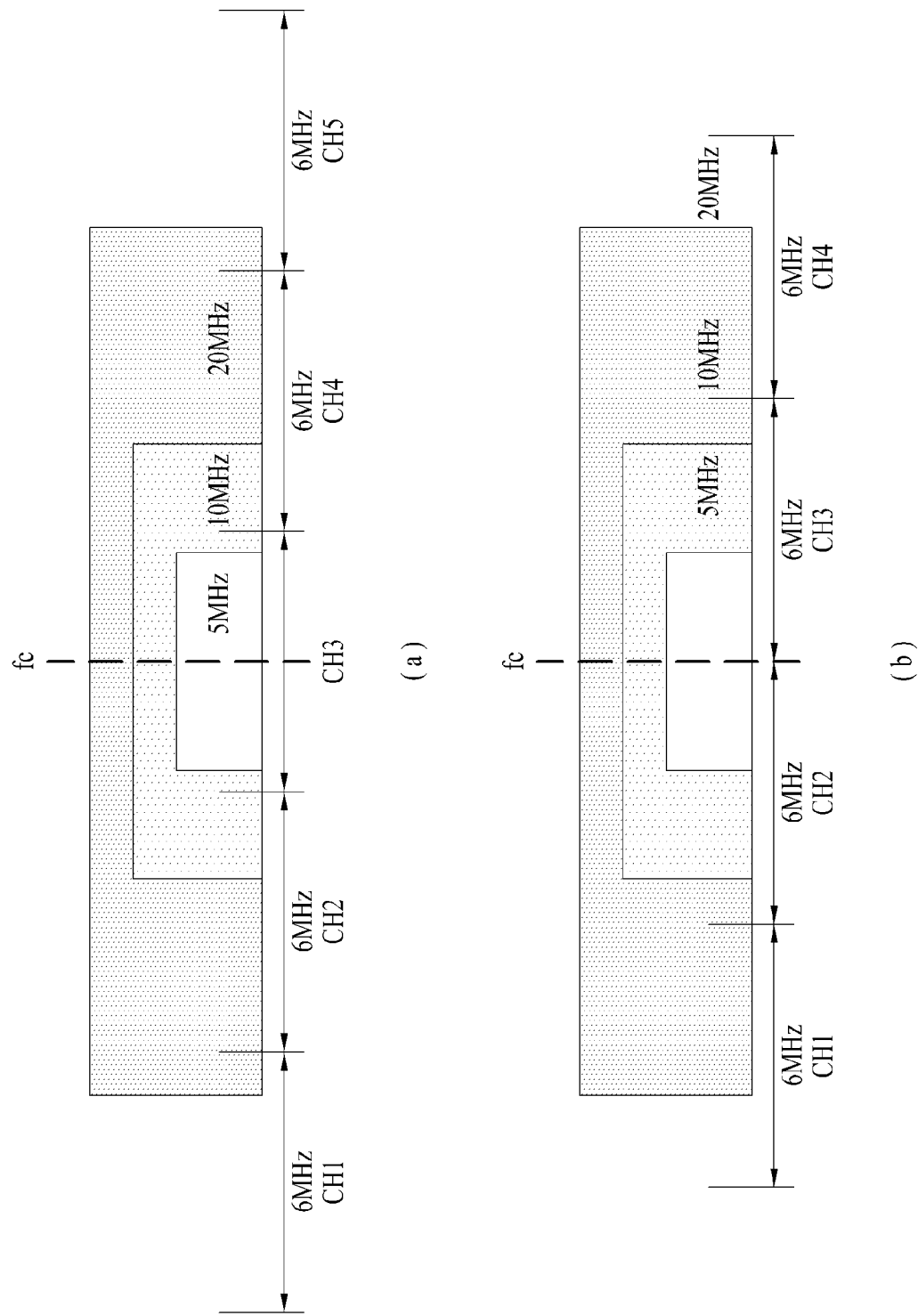
FIG. 6 is a diagram of an example in which a WLAN channel is allocated in a frequency band corresponding to available channel information.

FIG. 6 is a diagram of an example in which a WLAN channel is allocated in a frequency band corresponding to the aforementioned available channel information. In detail, FIG. 6(A) illustrates an example in which the available channel information is from a channel 1 CH1 to a channel 5 CH5. FIG. 6(B) illustrates an example in which the available channel information is from a channel 1 CH1 to a channel 4 CH4. As seen from FIG. 6(A), a WLAN channel having bandwidths of 5 MHz, 10 MHz, and 20 MHz can be allocated using a center of a channel 3 CH3 as a center frequency. As seen from FIG. 6(B), a WLAN channel having bandwidths of 5 MHz, 10 MHz, and 20 MHz can be allocated using a boundary of a channel 2 CH2 and a channel 3 CH3 as a center frequency.

In FIG. 6(B), even if the number of available channels is reduced compared with FIG. 6(A), if the center frequency of the WLAN channel of FIG. 6(A) is maintained, a WLAN channel of 20 MHz cannot be used and a WLAN channel of 10 MHz can be used due to a relationship with an adjacent channel by reducing maximum transmit power only. Here, the adjacent channel refers to a channel that adjoins the corresponding channel in opposite directions thereof (high and low frequency directions). When an incumbent user is not present in an adjacent channel to a channel used by the unlicensed device, a maximum transmit power level of the unlicensed device is approximately 100 mW. However, when the incumbent user is present in the adjacent channel, the maximum transmit power level of the unlicensed device may be limited to 40 mW (which is determined in consideration of federal communications commission (FCC) regulations regarding an adjacent channel. The FCC formulates regulations for communication in a whitespace band to ensure network stability, security, etc. An operation of a device that does not satisfy the FCC regulations needs to be prevented in the whitespace band. When a signal of an incumbent user is detected in a channel directly adjacent to a channel that is currently used by the unlicensed device, the unlicensed device needs to reduce transmit power thereof in the corresponding currently used channel).

Figure 7:
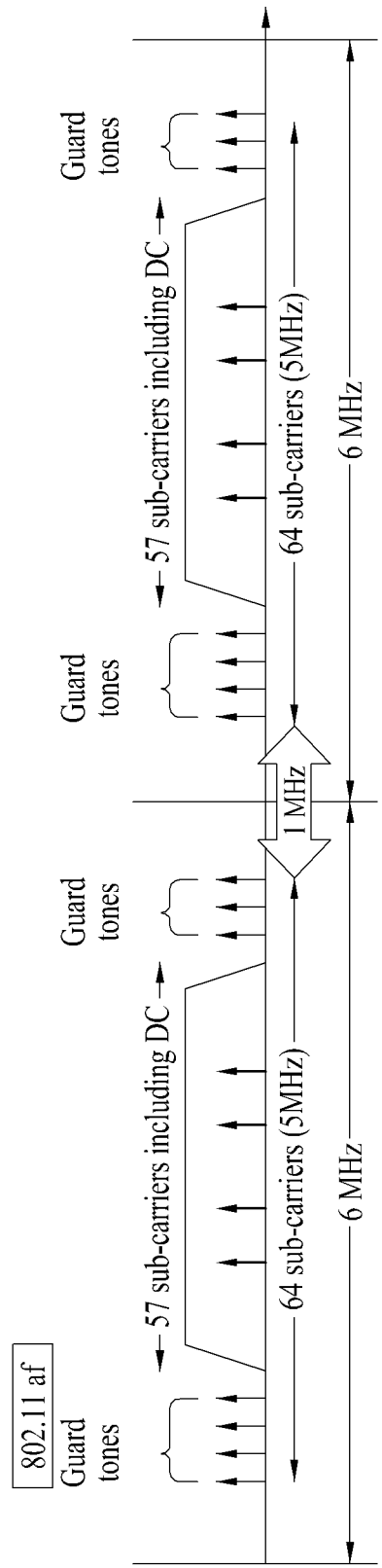
FIG. 7 illustrates channel bonding.

As illustrated in FIG. 6, when the WLAN channel is allocated in a frequency band corresponding to the available channel information, channel bonding may be used. That is, in FIG. 6, a WLAN channel having a bandwidth of 10 MHz that is allocated in the frequency band corresponding to the available channel information is contiguously allocated in a frequency band corresponding to the channel 2 CH 2 and the channel 3 CH3. However, as illustrated in FIG. 7, a WLAN channel having a bandwidth of 10 MHz can be used by non-contiguously allocating the WLAN channel in the frequency band and using channel bonding.

Figure 8:
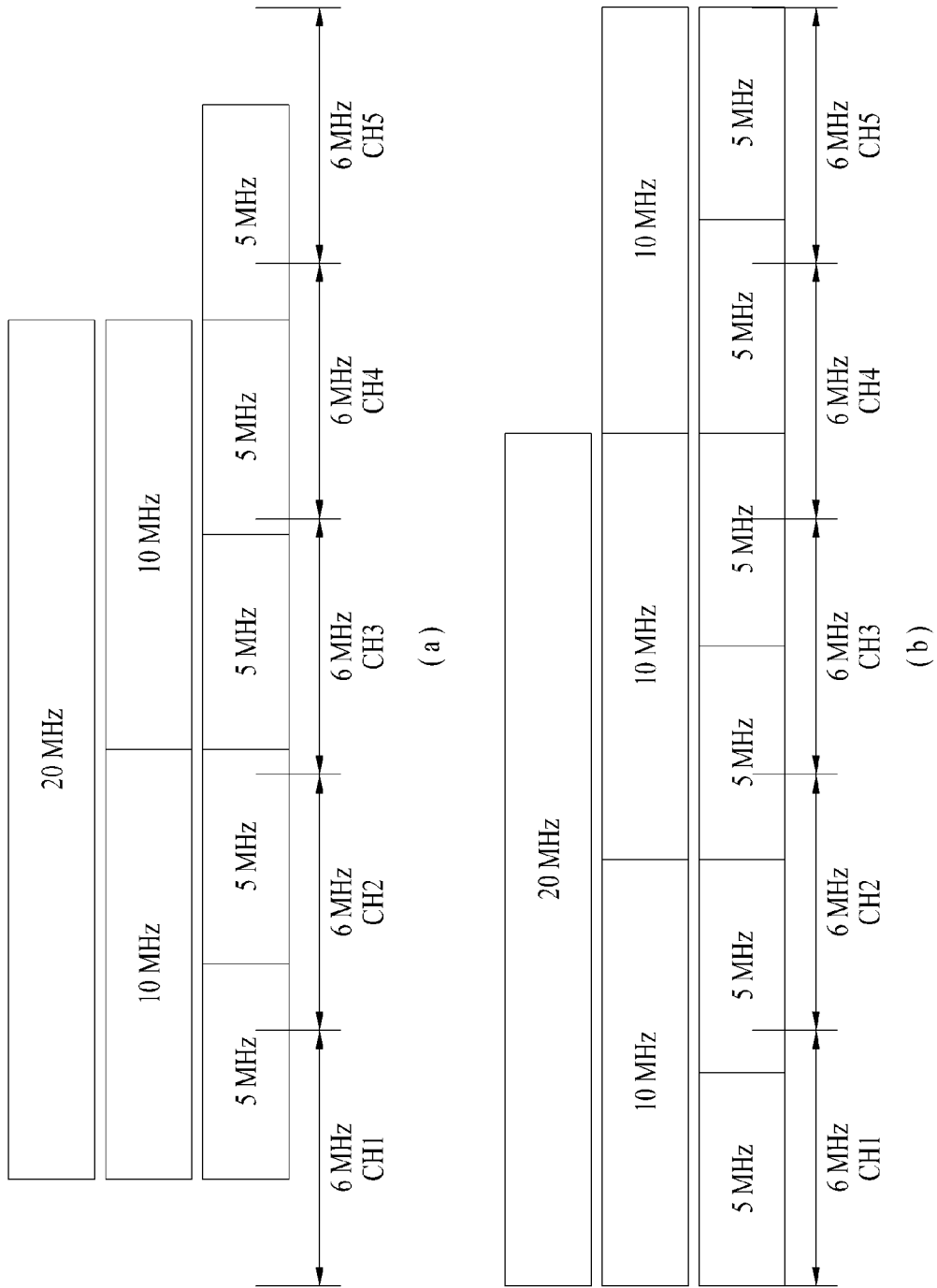
FIG. 8 illustrates various examples in which a WLAN channel is allocated in frequency bands corresponding to the same available channel information.

FIG. 8 illustrates various examples in which a WLAN channel is allocated in frequency bands corresponding to the same available channel information.

FIG. 8(A) illustrates an example in which five WLAN channels having a bandwidth of 5 MHz, two WLAN channels having a bandwidth of 10 MHz, and one WLAN channel having a bandwidth of 20 MHz are allocated. With regard to the WLAN channel having a bandwidth of 5 MHz, the channel 1 CH 1 and the channel 5 CH5 may correspond to adjacent channels. In this case, two WLAN channels that are partially included in a frequency band corresponding to the channel 1 CH1 and the channel 5 CH5 need to be used while reducing maximum transmit power to 40 mW.

FIG. 8(B) illustrates an example in which six WLAN channels having a bandwidth of 5 MHz, three WLAN channels having a bandwidth of 10 MHz, and one WLAN channels having a bandwidth of 20 MHz are allocated. As seen from FIG. 8(B), compared with FIG. 8(A), one more WLAN channel having a bandwidth of 5 MHz and one more WLAN channel having a bandwidth of 10 MHz are allocated but the number of WLAN channels having a bandwidth of 5 MHz, which can be used at a maximum transmit power of 100 mW, is reduced to two.

As described above, the WLAN channel is allocated using various methods (in consideration of maximum transmit power). However, IEEE 802.11 af formulates an operating class established for each respective country and uses a WLAN channel that is statically allocated according to operating class.

Table 1 below shows an example of the operating class in IEEE 802.11 af.

TABLE 1

| Operating class | Global operating class | Channel starting frequency (GHz) | Channel number multiplier (MHz) | Channel spacing (MHz) | Channel set | behavior limits set |
|---|---|---|---|---|---|---|
| <ANA> | | 0.156 | 0.5 | 10 | 48, 60, 72, 84, 96, 108 | |
| <ANA + 1> | | 0.156 | 0.5 | 5 | 42, 54, 66, 78, 90, 102, 114 | |
| <ANA + 2> | | 0.45 | 10.0 | 40 | 5, 9, 13, 21 | |
| <ANA + 3> | | 0.45 | 10.0 | 20 | 4, 6, 8, 10, 12, 14, 20, 23, 4, 5, 6, 7, 8, 9, 10, 11, 12, 13, 14, 19, 20, 21, 222 | |
| <ANA + 4> | | 0.455 | 10.0 | 10 | 3, 4, 5, 6, 7, 8, 9, 10, 11, 12, 13, 14, 19, 20, 21, 22 | |
| <ANA + 5> | | 0.45 | 1.0 | 10 | 26, 32, 38, 44, 50, 56, 62, 68, 74, 80, 86, 92, 98, 104, 110, 116, 122, 128, 134, 140, 146, 152, 170, 176, 182, 188, 194, 200 | |

TABLE 1-continued

| Operating class | Global operating class | Channel starting frequency (GHz) | Channel number multiplier (MHz) | Channel spacing (MHz) | Channel set | behavior limits set |
|---|---|---|---|---|---|---|
| <ANA + 6> | | 0.450 | 1.0 | 5 | 23, 29, 35, 41, 47, 53, 59, 65, 71, 77, 83, 89, 95, 101, 107, 113, 119, 125, 131, 137, 143, 149, 155, 167, 173, 179, 185, 191, 197 | |
| <ANA + 7> | | 0.65 | 1.0 | 10 | 6, 12, 18, 24, 30, 36, 42 | |
| <ANA + 8> | | 0.65 | 1.0 | 5 | 3, 9, 15, 21, 27, 33, 37, 45 | |

As shown in Table 1 above, WLAN channel allocation in a frequency band is determined based on a channel number (e.g., 23, 29, . . . in case of operating class <ANA+6>) included in the channel set and other information. In detail, a center frequency of the WLAN channel may be obtained based on a channel start frequency, a channel number multiplier, and a channel number included in a channel set according to Equation 1 below.

Channel center frequency=channel starting frequency+channel number multiplier*nch (MHz)   Equation 1

Here, nch is a channel number and satisfies nch=0, 1, . . . , 200.

Figure 9:
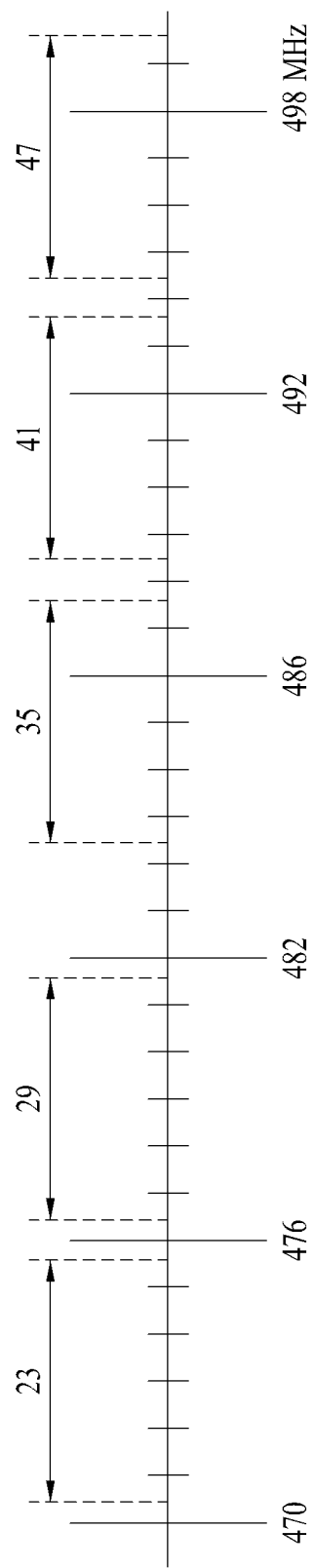
FIG. 9 illustrates some of WLAN allocation determined according to a specific operating class.

FIG. 9 illustrates some of WLAN allocation (which corresponds to channel number 23, 29, 35, 41, and 47) determined according to Table 1 above and Equation 1 above in case of the operating class <ANA+6>.

When the WLAN channel is statically determined, the WLAN channel cannot be used according to the available channel information or maximum transmit power may be unnecessarily limited. That is, in FIG. 9, when a frequency band corresponding to an available channel is 470 to 500 MHz, a WLAN channel having an available bandwidth of 5 MHz is 23, 29, 35, 41, and 47, but when a channel corresponding to a frequency band of 486 to 492 MHz is not available, the available WLAN channels are reduced to 23, 29, and 47. However, in this case, when the WLAN channel is dynamically allocated, at least WLAN channel 35 can be used. Thus, hereinafter, a method of allocating a WLAN channel will be described.

FIG. 10 is a diagram illustrating dynamic WLAN allocation according to an embodiment of the disclosure. Hereinafter, we assume that available channel information is of type 1 (=TV band WSM) in a whitespace map. FIG. 10(A) illustrates WLAN channel allocation when the available channel information corresponds to TV CHs 1, 2, and 3. FIG. 10(B) illustrates dynamic WLAN channel allocation when the available channel information is changed to TV CHs 1 and 3, that is, when the TV CH 2 is used as a primary user. For convenience of description, we assume an operating class, which has a channel start frequency of 500 MHz, a channel number multiplier of 1, channel spacing of 5 MHz, and channel number included in a channel set of 4, 9, and 14, is used. fc refers to a center frequency of the WLAN channel.

FIG. 10(A) illustrates the assumed operating class and the WLAN channel allocation determined according to Equation 1 above. In this situation, when the TV CH 2 is used by a primary user, the WLAN channel may be dynamically reallocated as illustrated in FIG. 10(B). That is, as seen from FIG. 10(A), a center frequency of a WLAN channel 4 that occupies a frequency band corresponding to the TV CH 1 is moved to 1 MHz in a left direction via the reallocation. Similarly, a center frequency of a WLAN channel 14 that occupies a frequency band corresponding to TV CH 3 is moved to 1 MHz in a right direction via the reallocation. This change in center frequency leads to a change in channel number according to Equation 1 above. That is, as illustrated in FIG. 10(B), the channel number included in the channel set is changed to 3 and 15 from 4, 9, and 14 via the reallocation.

Thus, according to the present embodiment of the disclosure, when dynamic WLAN channel allocation is applied, an STA needs to be informed of the changed channel number. To this end, a channel set management information element format illustrated in FIG. 11 may be used. Referring to FIG. 11, the channel set management information element format may include fields of an element ID, a length, an operating class, a number of channel, and channel number n. The operating class field refers to an operating class of a channel set to which dynamic WLAN channel allocation is applied. The number of channel contains the number of WLAN channels included in the channel number n field. The channel number n field contains a channel number included in the changed channel set.

The channel set management information element format may be included in at least one of a beacon frame, a probe response frame, an association response frame, and a re-association response frame. When the STA receives the channel set management information element format, the STA may update a channel set established by an AP. In addition, the dynamic channel reallocation may be performed such that as many WLAN channels as possible may be included in a frequency band corresponding to the available channel information or may be performed in consideration of maximum transmit power.

The channel set management information element format may include maximum transmit power fields for respective channel number fields contained in the channel number n frame. In this case, a frame illustrated in FIG. 12 may be used.

Allocation of WLAN Channel and Selection of Non-Overlapping Channel

The channel set management information element format may be used to indicate overlapping channel numbers among channel numbers included in the channel set. It may be effective that devices used in a smart grid, machine to machine (M2M), and so on use non-overlapping WLAN channels. In this case, the channel set management information element format may be established such that a channel number transmitted to the channel set is not used by an STA, which will be described in detail hereinafter.

Table 2 below shows performance comparison between the IEEE 802.11ac PHY and the IEEE 802.11af PHY. The IEEE 802.11af PHY obtained by 1/10 down-clocking the IEEE 802.11ac PHY provides 2 MHz/4 MHz/8 MHz/16 MHz/8+8 MHz channel bandwidth. When the 1/10 down-clocking is performed, a guard interval (GI) increases to 8 μs from 0.8 μs.

TABLE 2

| IEEE 802.11ac PHY | | IEEE 802.11af PHY | |
|---|---|---|---|
| Channel bandwidth (MHz) | Throughput (Mbps) | Channel bandwidth (MHz) | Throughput (Mbps) |
| 20 | 86.7 | 2 | 8.67 |
| 40 | 200 | 4 | 20 |
| 80 | 433.3 | 8 | 43.33 |
| 160 | 866.7 | 16 | 86.67 |
| 80 + 80 | 866.6 | 8 + 8 | 86.67 |

Figure 13:
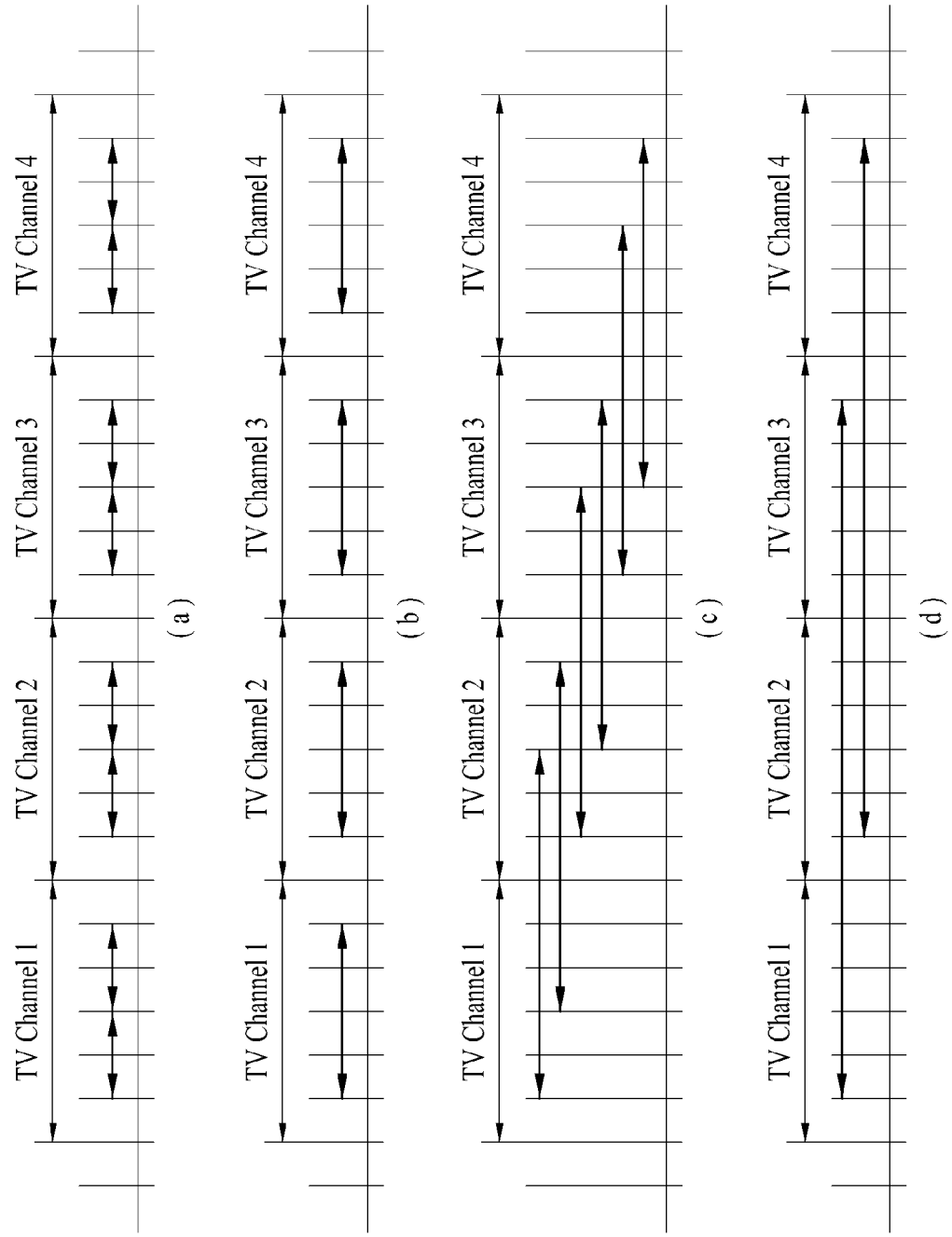
FIG. 13 illustrates allocation of overlapping/non-overlapping WLAN channels.

In Table 2 above, a WLAN channel having a channel bandwidth of the IEEE 802.11af PHY is allocated in a whitespace to constitute a channel set, as illustrated in FIG. 13. In detail, FIG. 13(A) illustrates an example of a WLAN channel set having a bandwidth of 2 MHz in a TV band including TV channels having a bandwidth of 6 MHz. One TV channel having a bandwidth of 6 MHz supports two non-overlapping WLAN channels having a bandwidth of 2 MHz.

FIG. 13(B) illustrates an example of a WLAN channel set having a bandwidth of 4 MHz. In this case, two WLAN channels having a bandwidth of 2 MHz are bonded and used. Due to transmission in the form of 2 MHz duplicated-PPDU, STAs belonging to a certain 2 MHz BSS may detect a preamble of a PPDU using a bandwidth of 4 MHz in an overlapping basic service set (OBSS) environment. One 6 MHz TV channel supports one non-overlapping WLAN channel having a bandwidth of 4 MHz.

FIG. 13(C) illustrates an example of a WLAN channel set having a bandwidth of 8 MHz. In this case, four WLAN channels having a bandwidth of 2 MHz are bonded and used. Due to transmission in the form of 2 MHz duplicated-PPDU, STAs belonging to a certain 2 MHz BSS/4 MHz BSS may detect a preamble of a PPDU using a bandwidth of 8 MHz in an OBSS environment. Two 6 MHz TV channels support two overlapping WLAN channels having a bandwidth of 8 MHz. The overlapping WLAN channels are supported in order to support two non-overlapping WLAN channels in three 6 MHz TV channels. For example, when a TV channel 1 and a TV channel 2 are available, it may be seen that two non-overlapping channels are configured via an overlapping WLAN.

FIG. 13(D) illustrates an example of a WLAN channel set having a bandwidth of 16 MHz. In this case, eight WLAN channels having a bandwidth of 2 MHz are bonded and used. Due to transmission in the form of 2 MHz duplicated-PPDU, STAs belonging to a certain 2 MHz BSS/4 MHz BSS/8 MHz BSS may detect a preamble of a PPDU using a bandwidth of 16 MHz. Three 6 MHz TV channels supports one non-overlapping WLAN channel having a bandwidth of 16 MHz. In addition, four 6 MHz TV channels supports two overlapping WLAN channels having a bandwidth of 16 MHz. STAs belonging to different 16 MHz BSSs may detect a preamble of a PPDU using a bandwidth of 16 MHz, transmitted from the different BSSs.

The operation class in the form shown in Table 1 above is defined using the WLAN channel sets exemplified in FIG. 13, which is shown in Table 3 below.

TABLE 3

| Operation Class | Channel start Frequency (MHz) | Channel number multiplier (MHz) | Channel bandwidth (MHz) | Channel set |
|---|---|---|---|---|
| <ANA> | 450 | 1 | 2 | 22, 24, 28, 30, 34, 36, 40, 42 . . . |
| <ANA + 1> | 450 | 1 | 4 | 23, 29, 35, 41, 47, 53, 59, 65 . . . |
| <ANA + 2> | 450 | 1 | 8 | 25, 27, 31, 33, 37, 39, 43, 45 . . . |
| <ANA + 3> | 450 | 1 | 16 | 29, 35, 41, 47, 53, 59, 65, 71 . . . |

As shown in Table 3 above, an AP may determine available WLAN channels among channel numbers of the channel set in consideration of available channel information. In this case, the AP may transmit channel numbers included in an overlapping channel among channel numbers of the channel set through the channel number n field of FIG. 11 or 12. The STA may not use the received channel number.

Figure 14:
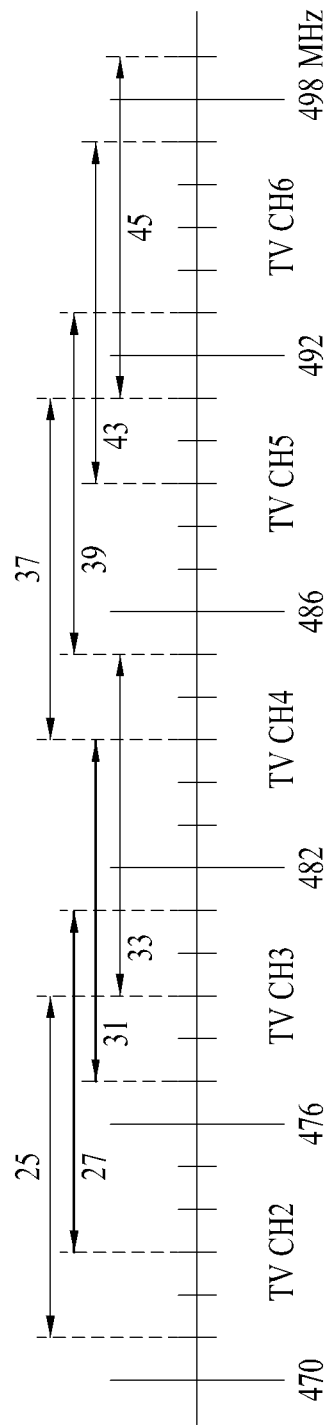
FIG. 14 is a diagram for explanation of selection of a specific channel in a WLAN channel set.

In detail, referring to FIG. 14, when TV channels 2, 3, and 4 are available based on the available channel information, the AP may select WLAN channels 37 and 31 corresponding to the overlapping channel among available channel numbers 25, 27, 31, and 33 included in the channel set. The channel numbers 25 and 33 except for the selected channel numbers 37 and 31 are contained in the channel number n field of the channel set management information element format and transmitted to the STA. The STA does not allow usage of channel numbers 27 and 31 contained in the channel number n field.

Figure 15:
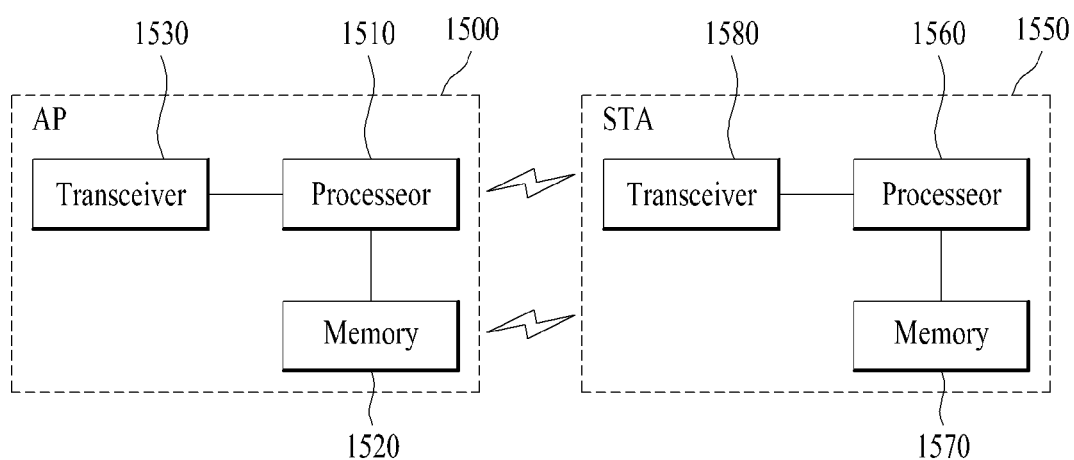
FIG. 15 is a block diagram illustrating a structure of a wireless device according to an embodiment of the disclosure.

FIG. 15 is a block diagram illustrating a structure of a wireless device according to an embodiment of the disclosure.

An AP 1500 may include a processor 1510, a memory 1520, and a transceiver 1530. An STA 1550 may include a processor 1560, a memory 1570, and a transceiver 1580. The transceivers 1530 and 1580 may transmit/receive a radio signal, and for example, may embody a physical layer according to the IEEE 802 system. The processors 1510 and 1560 are connected to the transceivers 1530 and 1580 to embody a physical layer and/or a MAC layer according to the IEEE 802 system. The processor 1510 may control an operation of the AP 1550 that generates and transmits an information element (or frame) containing maximum permissible transmit power information according to the above various embodiments of the disclosure. The processor 1560 may control the STA 1550 to receive the information element (or frame) containing the maximum permissible transmit power information according to the above various embodiments of the disclosure and to perform communication according to a maximum permissible transmit power level indicated in a specific channel according to a value indicated by the corresponding information element (or frame). The processor 1560 may be configured to perform wireless communication through the transceivers 1530 and 1580. In addition, a module for embodying operation of the AP and the STA according to the above various embodiments of the disclosure may be stored in the memories 1520 and 1570 and executed by the processors 1510 and 1560. The memories 1520 and 1570 may be included in the processors 1510 and 1560 or installed outside the processors 1510 and 1560 and connected to the processors 1510 and 1560 via a known means.

Detailed configurations of the aforementioned AP apparatus and STA apparatus may be applied so as to independently apply the detailed description based on the aforementioned various embodiments of the disclosure or to simultaneously apply two or more embodiments of the disclosure. A repeated description is omitted for clarity.

The embodiments of the present invention may be achieved by various means, for example, hardware, firmware, software, or a combination thereof.

In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The aforementioned various embodiments of the disclosure have been described in terms of the IEEE 802.11 system but can be applied to various mobile communication systems in the same manner.

The invention claimed is:

1. A method of setting an operation channel for a second station (STA) in a whitespace by a first STA, the method comprising:
acquiring information regarding available TV channels from a geo-location database; and
transmitting setting information regarding the operation channel, determined based on the information regarding the available TV channels, to the second STA,
wherein the operation channel is defined as a channel structure from among a plurality of channel structures, including channel widths consisting of two non-contiguous frequency parts, each of which including two contiguous W MHz channels when a minimum channel bandwidth supported by the operation channel is W MHz.

2. The method according to claim 1, wherein:
the operation channel is defined as being present spaced apart from a channel starting frequency by a predetermined frequency; and
the setting information regarding the operation channel comprises information regarding the predetermined frequency.

3. The method according to claim 2, wherein the predetermined frequency is set to be an integer multiple of W when the minimum channel bandwidth supported by the operation channel is W MHz.

4. The method according to claim 1, wherein the plurality of channel structures includes:
(a) one W MHz channel width;
(b) two contiguous W MHz channel widths;
(c) four contiguous W MHz channel widths; and
(d) two non-contiguous W MHz channel widths.

5. The method according to claim 4, wherein the channel starting frequency is a frequency of a first channel of the available TV channels.

6. The method according to claim 4, wherein one W MHz channel is positioned in a center of one TV channel of the available TV channels.

7. The method according to claim 4, wherein the operation channel and the available TV channels are spaced apart from each other by a predetermined guard interval.

8. The method according to claim 7, wherein the primary channel for each of the operation channels corresponding to (c) is set to be the same frequency location.

9. The method according to claim 7, wherein clear channel assessment (CCA) is performed on each of the operation channels corresponding to (a) to (d) using the primary channel.

10. The method according to claim 4, wherein a location of the operation channel is specified according to a location of a primary channel with W MHz.

11. The method according to claim 4, wherein:
the first STA is an enabling STA; and
the second STA is a dependent STA.

12. A method of receiving operation channel setting information from a first station (STA) in a whitespace by a second STA, the method comprising:
receiving setting information regarding the operation channel determined based on information regarding available TV channels from the first STA; and
determining a location of the operation channel based on the operation channel setting information,
wherein the operation channel is defined as a channel structure from among a plurality of channel structures, including channel widths consisting of two non-contiguous frequency parts, each of which including two contiguous W MHz channels when a minimum channel bandwidth supported by the operation channel is W MHz.

13. A first station (STA) apparatus for setting an operation channel for a second station (STA) in a whitespace, the first STA apparatus comprising:
a transceiver configured to perform transmission and reception with other devices; and
a processor configured to:
control the first STA comprising the transceiver;
acquire information regarding available TV channels from a geo-location database (DB); and
transmit setting information regarding the operation channel, determined based on the information regarding the available TV channels, to the second STA using the transceiver, and
wherein the operation channel is defined as a channel structure from among a plurality of channel structures, including channel widths consisting of two non-contiguous frequency parts, each of which including two contiguous W MHz channels when a minimum channel bandwidth supported by the operation channel is W MHz.

14. A second station (STA) apparatus for receiving operation channel setting information from a first STA in a whitespace, the second STA comprising:
- a transceiver configured to perform transmission and reception with other devices; and
- a processor configured to:
  - control the second STA comprising the transceiver;
  - receive setting information regarding the operation channel, determined based on information regarding available TV channels from the first STA; and
  - determine a location of the operation channel based on the operation channel setting information, and
  - wherein the operation channel is defined as a channel structure from among a plurality of channel structures, including channel widths consisting of two non-contiguous frequency parts, each of which including two contiguous W MHz channels when a minimum channel bandwidth supported by the operation channel is W MHz.

* * * * *